United States Patent [19]

Ramsay

[11] 3,956,639
[45] May 11, 1976

[54] GROUND MONITOR FOR ELECTRICAL APPARATUS

[76] Inventor: John W. Ramsay, 910 Second Ave. North, Birmingham, Ala. 35202

[22] Filed: Feb. 24, 1975

[21] Appl. No.: 552,414

[52] U.S. Cl. .............................. 307/94; 317/18 R; 324/51
[51] Int. Cl.² ......................................... H02H 3/00
[58] Field of Search ................. 324/51; 307/92, 93, 307/94; 317/18 R, 18 A, 18 B, 18 C, 18 D; 340/255, 256, 253 R

[56] References Cited
UNITED STATES PATENTS

| | | |
|---|---|---|
| 3,308,346 | 3/1967 | Martzloff et al. ................. 317/18 R |
| 3,665,251 | 5/1972 | Buckeridge ....................... 317/18 A |
| 3,727,106 | 4/1973 | Mandel et al. ..................... 317/18 R |
| 3,746,929 | 7/1973 | Kotheimer ......................... 317/18 A |
| 3,771,020 | 11/1973 | Smith ................................ 317/18 D |
| 3,787,708 | 1/1974 | Hobson ................................. 324/51 |

Primary Examiner—Robert K. Schaefer
Assistant Examiner—M. Ginsburg
Attorney, Agent, or Firm—Jennings, Carter & Thompson

[57] ABSTRACT

Apparatus to monitor the continuity of grounding circuits of an electrical machine. The apparatus measures the resistance in the grounding and pilot circuits and deenergizes the electrical machine if the resistance in said circuits exceeds a predetermined value.

3 Claims, 1 Drawing Figure

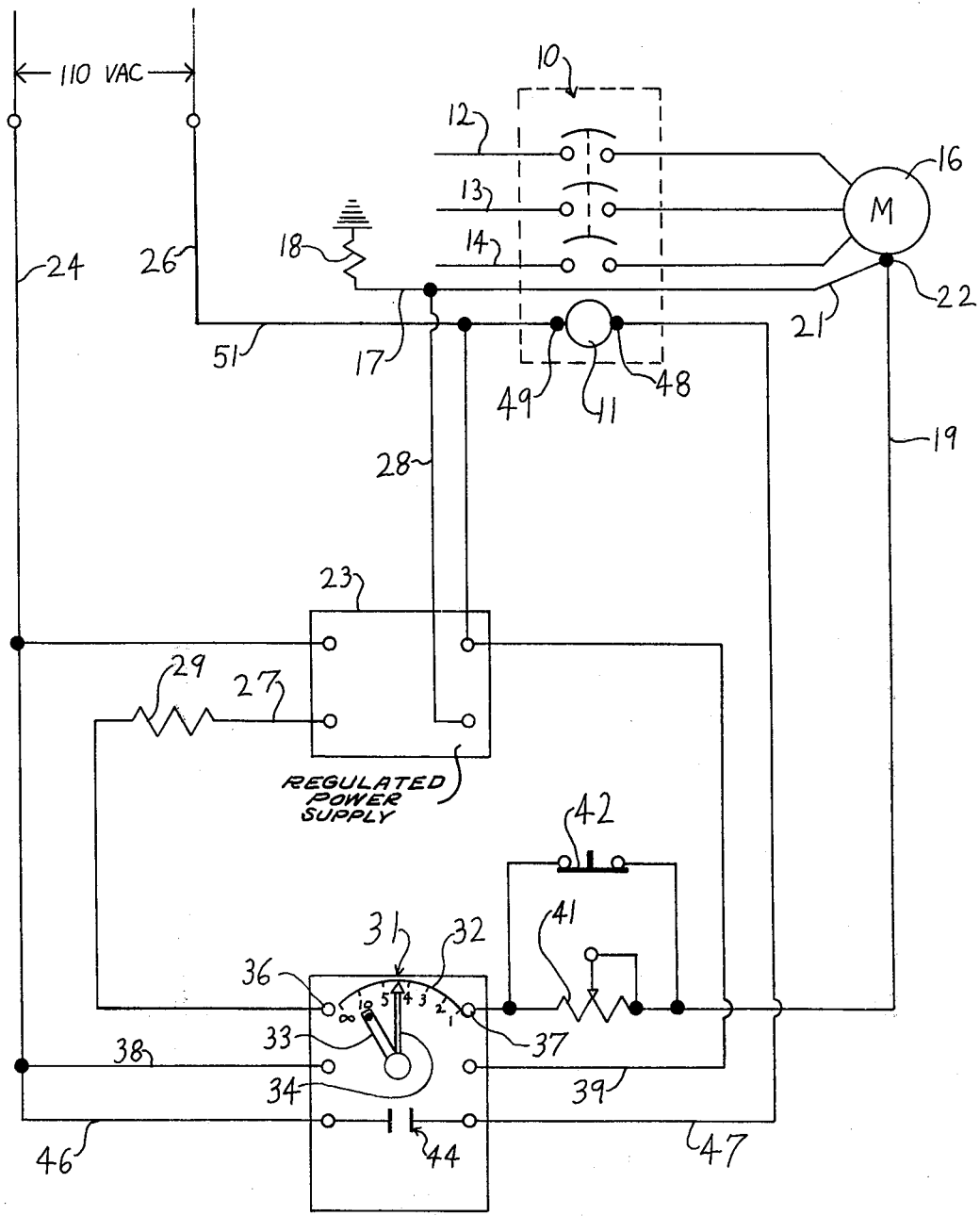

GROUND MONITOR FOR ELECTRICAL APPARATUS

This invention relates to apparatus which will assure the prevention of shock to persons working around electrically powered apparatus such for instance as conveyor drives, mining machines, hydraulic power units and the like.

In many instances in industry such as in mining, present safety laws require that the voltage on the frame of any electrically driven equipment shall be limited under ground fault conditions to a value insufficient to cause death or serious injury to workers who come in contact therewith. Specifically, in low and medium voltage (below 1,000 V.) resistance grounded distribution systems, the allowable voltage is 40 volts. In high voltage (above 1,000 V.) applications present safety laws permit the application of 100 volts to the frame of the apparatus under these fault conditions.

My improved apparatus monitors the resistance between the frame of the apparatus being protected and ground, at all times, and affords means, in the event of the increase of such resistance beyond a predetermined value, to deenergize the machine being protected.

Specifically, and in carrying out my invention I propose to impress a small voltage, for instance 6 volts DC, on the circuit consisting of the usual pilot wire and ground wire which are connected to the frame of the apparatus to be protected. The current flowing in this circuit is indicated by an ammeter calibrated in ohms, thus to provide a visual indication of the resistance of the circuit. The meter is equipped with a manually adjustable set point so that if the resistance in the circuit reaches or exceeds the set point, internal contacts in the meter are opened. Opening of these contacts immediately deenergizes the under voltage release coil of the power circuit breaker, thus deenergizing the electrical machine being protected.

In view of the foregoing it will be seen that whenever, for any reason, the resistance of the protected apparatus relative to ground exceeds the predetermined resistance as determined by the set point, power to the apparatus being protected is interrupted.

Apparatus illustrating features of my invention is shown in the accompanying diagrammatic wiring diagram, the single FIGURE of which illustrates in diagrammatic manner my invention applied to protect an electric motor, which motor may be the drive for various and sundry apparatus, devices and machines.

Referring to the drawing for a better understanding of my invention I illustrate at 10 a power circuit breaker with an under-voltage release coil 11. As is understood, three phase current applied by the circuits 12, 13 and 14 is connected to the motor 16 which in the case illustrated is the motor to be protected. Additionally, and as presently is common in the art, the supply system includes a ground wire 17 which goes to ground through a resistor 18.

My invention comprises means to sense, automatically and continuously, the resistance in a circuit formed of the pilot wire 19 and the ground wire 21, both of which are connected to the frame of the motor 16 as indicated at 22. First, I provide a power supply 23 which may be powered from a 110 volt AC source through the lines 24 and 26. The power supply 23 may be of the regulated type which will produce an output of 6 volts DC to the lines indicated by the numerals 27 and 28. In the line 27 I may place a series resistor on the order of approximately 3 ohms as indicated at 29. The purpose of the resistor 29 is to limit the output of the power supply under zero resistance conditions in the circuit 21-19.

At 31 I indicate an ammeter which has a dial specially calibrated to read in ohms. Thus, the scale indicated at 32 may read, from right to left, 0 ohms to infinity. The meter may also incorporate a manually adjustable set point indicator needle 33 and the indicating needle 34. The needle 34 of the meter 31 responds to current flowing through the meter from the connections 36 and 37. A meter suitable for use in my circuit is manufactured by the General Electric Company, 40 Federal Street, Lynn, Mass. 01910 and is described on pages 19 to 21, inclusive of that company's bulletin GEP-307C dated December, 1974. The internal schematic diagram for a set point unit is shown on page 38 of said bulletin.

Power to operate the meter 31 is supplied through branch lines 38 and 39 from the 110 volt AC power supply.

Between the line 19 and the connection 37 of the meter I interpose a variable resistance indicated at 41. A normally closed push button 42 is connected to bypass the variable resistance 41 and the function and operation of this part of the circuit will be later explained.

It will be seen that the ground wire 17 connected by lead 28, is a continuation of the ground wire 21 secured to the frame of the motor.

A set of normally open, relay control contact points 44 has one side thereof connected to the line 24 by a branch line 46. The opposite side of the set of contacts is connected by a line 47 to one terminal 48 of the undervoltage coil 11. The opposite terminal 49 of the coil 11 is connected by a branch line 51 to the other power supply line 26.

Keeping in mind the foregoing description of the circuitry involved, it is now possible more definitely to explain the function and advantages of my invention.

As stated, the whole object is to prevent injury or death to a person who may come into contact with the frame of the motor 16, or a frame or machine on which it is mounted, during the time of a line to ground fault involving such machine.

With the apparatus installed as indicated, it will be understood that the motor 16 is energized by the manual closing of the power circuit breaker 10. With power supplied through the lines 24 and 26 to the meter 31 and to the power supply 23 the meter 31 starts to measure the resistance in the circuit 21-19. With the needle 33 preset to determine the maximum allowable resistance in the circuit 21-19 it will be seen that in the event the resistance in such circuit exceeds the preset amount contacts 44, which are closed upon energization of the system, immediately are opened. This deenergizes the coil 11, permitting the opening of the contacts supplying energy to the motor.

It will be understood that the contacts 44 are closed whenever the needle 34 of the meter indicates a resistance in the circuit lower than the set point indicated by the needle 33. Thus, when the system is in operation needle 34 is reading less ohms than the set point and any time the resistance of the circuit rises to a value above the set point contacts 44 open.

The variable resistor 41 and push button 42 are used to test the opening of the contacts 44. That is to say, by selecting the proper resistance afforded within the range of the variable resistor 41, the system may be tested to assure that the contacts 44 open in the event of an increase in resistance in the circuit 21-19 beyond the set point value.

In view of the foregoing it will be seen that I have devised an improved, simple and fail-safe apparatus which adequately protects against dangerous shocks from various types of machinery to which it may be applied. It will be especially noted that my invention causes a deenergization of the motor 16 at any time the resistance in the circuit 21-19 increases above a predetermined amount, from any cause. My improved apparatus thus does not rely upon the existance of a fault before deenergizing the motor 16; on the other hand it is always available to shut the motor down simply upon an increase in the resistance of the circuit 21-19.

It will be noted that my improved apparatus is connected to ground through a branch line at the point of supply. All of the ground wire 17 from the supply toward the motor is therefore in circuit with the ground wire 21. The measurement of the resistance in the circuit 21-19 therefore includes all of the pilot wire 19 and all of the ground wire 17 between the source of supply and the motor. Interruptions of either of these circuits, as for instance, by damage to the cable or otherwise, will immediately cause a deenergization of the motor 16.

While I have shown my invention in but one form, it will be obvious to those skilled in the art that it is not so limited but is susceptible of various changes and modifications without departing from the spirit thereof.

What I claim is:

1. In apparatus for controlling the supply of energy to an electrically driven machine wherein the circuitry associated with the machine includes power supply circuits, a grounding circuit, and a pilot circuit, a. means to impress a predetermined substantially constant DC voltage on a circuit embodying the grounding circuit and said pilot circuit,
b. an ammeter in said grounding and pilot circuits set forth in (a) above having a set of normally open contacts which close when the resistance in said circuits is less than a predetermined value, and
c. means controlling the supply of energy to said machine under control of said contacts.

2. Apparatus continuously to monitor and measure the resistance in a circuit comprising the usual grounding circuit and associated pilot circuit electrically connected to the frame of an electrical apparatus comprising:

a. means to impress a predetermined substantially constant DC voltage on a circuit embodying the grounding circuit and said pilot circuit,
b. an ammeter in said grounding and pilot circuits having a set of normally open contacts which close when the resistance in said circuit is less than a predetermined value,
c. a set point indicator on said ammeter visually to indicate the allowable resistance in said circuits, and
d. means supplying energy to said electrical apparatus under control of said contacts, whereby when the resistance in said circuits exceeds the resistance indicated by said set point indicator, said contacts open, deenergizing the electrical apparatus being controlled.

3. Apparatus as defined in claim 2 in which there is means in said circuits to test said ammeter to assure that said contacts open when the resistance of the circuits exceeds the value indicated by the set point indicator.

* * * * *